(12) United States Patent
Wakatake et al.

(10) Patent No.: US 8,021,581 B2
(45) Date of Patent: Sep. 20, 2011

(54) FLAME RETARDANT COMPOSITION, FLAME-RETARDANT RESIN COMPOSITION AND MOLDED PRODUCT AND FIBER MADE OF FLAME-RETARDANT RESIN COMPOSITION

(75) Inventors: Shoichi Wakatake, Tajimi (JP); Kazuhiko Kosuge, Tokyo (JP)

(73) Assignee: Du Pont-Toray Company, Ltd., Tokyo (JP)

( * ) Notice: Subject to any disclaimer, the term of this patent is extended or adjusted under 35 U.S.C. 154(b) by 507 days.

(21) Appl. No.: 12/076,356

(22) Filed: Mar. 17, 2008

(65) Prior Publication Data
US 2009/0230366 A1 Sep. 17, 2009

(51) Int. Cl.
*C09K 21/14* (2006.01)
*C09K 21/02* (2006.01)
*C08K 3/20* (2006.01)
*C08K 5/16* (2006.01)

(52) U.S. Cl. ........ 252/609; 252/606; 524/437; 524/438; 524/444; 524/456

(58) Field of Classification Search .................. 252/609, 252/606; 524/437, 441
See application file for complete search history.

(56) References Cited

U.S. PATENT DOCUMENTS

| | | | | |
|---|---|---|---|---|
| 4,060,451 A | * | 11/1977 | Uchiyama et al. | 162/157.3 |
| 5,196,262 A | * | 3/1993 | Schwarz et al. | 428/315.5 |
| 5,948,323 A | * | 9/1999 | McLaughlin et al. | 252/610 |
| 2002/0188060 A1 | * | 12/2002 | Okada et al. | 524/589 |
| 2006/0082708 A1 | * | 4/2006 | Nagase et al. | 349/124 |
| 2006/0083928 A1 | * | 4/2006 | Miyagawa et al. | 428/413 |
| 2008/0300349 A1 | * | 12/2008 | Fuchikami et al. | 524/117 |
| 2009/0137743 A1 | * | 5/2009 | Ito et al. | 525/223 |
| 2010/0331467 A1 | * | 12/2010 | Wakatake et al. | 524/401 |

FOREIGN PATENT DOCUMENTS

| | | |
|---|---|---|
| JP | 1-141929 | 6/1989 |
| JP | 2006-273998 | 10/2006 |

OTHER PUBLICATIONS

English Language JP machine translation of JP Patent Publication No. 2006-273998 entitled: Flame-Retardant Resin Composition and Molded Product and Fiber Composed of the Same Resin Composition, by Wakatake et al. (2006).*

* cited by examiner

*Primary Examiner* — Joseph D Anthony
(74) *Attorney, Agent, or Firm* — Wenderoth, Lind & Ponack, L.L.P.

(57) ABSTRACT

To provide a halogen-free flame retardant composition containing no antimony, phosphorus and phosphorus compounds at all, a non-halogen flame-retardant resin composition of environmental type ideal for disaster prevention made of the flame retardant composition, which causes little carbon monoxide (CO) during combustion while having high flame retardance, and molded products, electric wires, cables, fiber or fiber post-processed products made of the resin composition. The flame retardant composition comprises a mixture of (A) a resin having an average particle diameter of not more than 1000 μm selected from wholly aromatic polyamide, polyimide, polyamideimide, a copolymer of the wholly aromatic polyamide, the polyimide or the polyamideimide or a mixture of the above mentioned polymers and (B) a metal hydrate. The flame-retardant resin composition contains 50 to 200 parts by mass of the flame retardant composition to 100 parts by mass of a thermoplastic resin or a thermosetting resin.

9 Claims, No Drawings

FLAME RETARDANT COMPOSITION, FLAME-RETARDANT RESIN COMPOSITION AND MOLDED PRODUCT AND FIBER MADE OF FLAME-RETARDANT RESIN COMPOSITION

BACKGROUND OF THE INVENTION

1. Field of the Invention

The present invention relates to a flame retardant composition and the like, and particularly to a halogen-free flame retardant composition containing no antimony, phosphorus and phosphorus compounds at all, a halogen-free flame-retardant resin composition of environmental flameproof type made of the flame retardant composition, which is slow in spreading fire during incipient fire and causes little carbon monoxide (CO) during combustion while having high flame retardance, and molded products, electric wires, cables, fiber or fiber post-processed products made of the resin composition.

2. Description of the Related Art

Resin using halogen compounds and antimony compounds together has widely been used for conventional flame-retardant materials. However, in recent years, with regard to halogen flame-retardant materials, the influence on the environment is regarded as a problem and the use thereof tends to be prohibited or restricted due to regulation in Europe; therefore, the development of halogen-free flame-retardant materials is in progress in each company.

Phosphorus-containing compounds are principally considered as halogen-free flame-retardant materials, and phosphorus flame retardants such as red phosphorus and phosphate are used; but yet the occurrence of phosphine gas during the use of red phosphorus is pointed out, and the problem is bleed-out during molding with regard to phosphate.

Thus, a halogen-free flame-retardant resin composition using magnesium hydroxide is proposed for the purpose of preventing secondary disasters such as fuming, toxicity and corrosion during combustion as described in Japanese Unexamined Patent Publication No. 01-141929, for example.

SUMMARY OF THE INVENTION

Generally, flame resisting is surmised as incomplete combustion, and flame resisting mechanism brings a possibility of causing oxygen ($O_2$) concentration to be diluted due to emission of harmful gas in large quantities. Flameproofing of plastics is important for causing no fires, while carbon monoxide poisoning and oxygen deficiency frequently take a precious life in the case of considering a real fire. Thus, the development of flame-retardant materials has been demanded, such as to cause as little carbon monoxide during combustion as possible.

However, due to incomplete combustion of materials as flame resisting mechanism, conventional flame-retardant plastics result in $O_2$ dilution due to the occurrence of gas in large quantities and the occurrence of harmful CO, and are accompanied by the occurrence of fuming and soot in large quantities. That is to say, while flameproofing is performed, CO as a problem after fire breaking tends to increase, and it is pointed out that the increase of CO is a problem in view of disaster prevention; therefore, materials are expected which have high flame retardance and decrease the occurrence of fuming, CO and soot after combustion is caused. Also, soot is a direct problem such as harmful inhalation and closed our sight during fire breaking, and additionally it is reportedly pointed out that soot is a factor of global warming. Here, high flame retardance signifies UL94 Test V0 (1/32").

The Building Standard Law of Japan prescribes that heating for 5 minutes be the condition, and in fact it is extremely important that the maximum combustion be not caused within 5 minutes; for example, arrival time of the maximum smoke concentration and the maximum heat generation rate is not less than 5 minutes, which leads to the delay of $O_2$ dilution. Accordingly, the realization of flame-retardant materials in which CO occurrence is little and fuming is restrained is also conceived to be the advent of an epoch-making technique.

The present invention has been made in view of the above-mentioned problems, and an object thereof is to provide a halogen-free flame retardant composition containing no antimony, phosphorus and phosphorus compounds at all, a halogen-free flame-retardant resin composition of environmental type ideal for disaster prevention made of the flame retardant composition, which causes little carbon monoxide (CO) during combustion while having high flame retardance, and molded products, electric wires, cables, fiber or fiber post-processed products made of the resin composition.

In order to achieve the above-mentioned object, the inventors of the present invention have made earnest studies, and as a result, found that a mixture of a specific resin having an average particle diameter of not more than 1000 μm and metal hydrate brings high flame retardance and allows harmful carbon monoxide to be restrained from occurring. The present invention has been completed.

That is, the present invention provides a flame retardant composition comprising a mixture of (A) a resin having an average particle diameter of not more than 1000 μm selected from wholly aromatic polyamide, polyimide, polyamideimide, a copolymer of the wholly aromatic polyamide, the polyimide or the polyamideimide or a mixture of the above mentioned polymers and (B) a metal hydrate.

Also, the present invention provides a flame-retardant resin composition containing the above-mentioned flame retardant composition in an amount of 50 to 200 parts by mass with respect to 100 parts by mass of a thermoplastic resin or a thermosetting resin.

Also, the present invention provides molded products, electric wires, cables, fiber or fiber post-processed products made of the above-mentioned flame-retardant resin composition.

The present invention can provide a flame-retardant resin composition which is flame-retardant, high in an LOI value and slight in the occurrence amount of harmful CO. In addition, molded products to be obtained have no anisotropy and favorable appearance.

The use of a specific resin having an average particle diameter of not more than 1000 μm together with metal hydrate develops high synergistic effect, which has not been capable of being produced in each single system. Therefore, products of environmental type ideal for disaster prevention, which are halogen-free flame-retardant materials, are slow in spreading fire during incipient fire and restrain CO from occurring while having high flame retardance, can particularly be realized in the case of being made into molded products, electric wires, cables and fiber.

A flame retardant composition, a flame-retardant resin composition, molded products, electric wires, cables, fiber or fiber post-processed products of the present invention are conceived to be halogen-free flame-retardant materials of real environmental type, which are free from environmental burden such as phosphoric acid elution during use and abandon-

DETAILED DESCRIPTION OF THE PREFERRED EMBODIMENTS ment, by reason of containing no phosphorus at all to bring no fear that phosphoric acid is eluted by water under the use environment.

Resin having an average particle diameter of not more than 1000 μm as an (A) component used in the present invention forms a char layer on the surface of molded products and has the function of restraining spreading fire and fuming during incipient fire. The resin is at least one kind selected from wholly aromatic polyamide, polyimide, polyamideimide, a copolymer thereof or a mixture thereof; these resins may be used singly or in proper combination of not less than two kinds. When the average particle diameter of the above-mentioned resin exceeds 1000 μm, a resin in a flame retardant composition is not melted at molding temperature of a thermoplastic resin in the case of blending the flame retardant composition with the thermoplastic resin, so that resin pellets can not be produced. The average particle diameter of the resin in a flame retardant composition is preferably not more than 800 μm, more preferably not more than 300 μm.

These resin particles can also be obtained by pulverizing films, sheets and molded products made of the above-mentioned resin. Pulverizing means and pulverizing methods are not particularly limited but known methods can be performed.

Here, a wholly aromatic polyamide is such that at least not less than 85 mol %, preferably 100 mol %, of amide bonds are obtained from an aromatic diamine component and an aromatic dicarboxylic acid component. Specific examples thereof include wholly aromatic polyamides such as polyparaphenylene terephthalamide, polymetaphenylene terephthalamide, polymetaphenylene isophthalamide and polyparaphenylene isophthalamide; aromatic polyamides in which aromatic diamine is bonded by groups such as ether group and contains two phenyl groups, such as 3,3'-oxydiphenylene diamine and 3,4'-oxydiphenylene diamine; or copolymers of the above-mentioned aromatic polyamides, such as a poly-3,3'-oxydiphenylene terephthalamide/polyparaphenylene terephthalamide copolymer and a poly-3,4'-oxydiphenylene terephthalamide/polyparaphenylene terephthalamide copolymer.

A polyimide is a resin produced by condensation polymerization of aromatic tetracarboxylic dianhydride and diamine, or the like, and is excellent in heat resistance, chemical resistance and electrical insulating properties. The polyimide may be either a thermosetting polyimide or a thermoplastic polyimide, and yet a thermoplastic polyimide is preferable in term of formation of a char layer stable in molding.

A polyamideimide is a resin produced by reaction of trimellitic anhydride and diisocyanate, or trimellitic chloride anhydride and diamine, and is so excellent in heat resistance as to be capable of being subjected to thermoforming, and is excellent in chemical resistance and electrical insulating properties.

The metal hydrate as a (B) component has the function of allowing flame retardance and tracking resistance. Examples of metal hydrate include magnesium hydroxide, aluminum hydroxide, calcium hydroxide, and the like. These metal hydrates can be used in the shape of powdery and granular material, flake or fiber. Among them, magnesium hydroxide or aluminum hydroxide is preferable and aluminum hydroxide is particularly preferable. The metal hydrates may be used singly or in proper combination of not less than two kinds.

In the present invention, it is important to blend a mixture of a specific resin having an average particle diameter of not more than 1000 μm as the (A) component and (B) metal hydrate, and in the case of blending either of them singly, flame retardance is insufficiently improved and the maintenance of shrink resistance is not intended. The mass ratio of the (A) component/the (B) component is preferably 1/99 to 80/20, more preferably 2/98 to 50/50. When the ratio of the (A) component is less than 1, flame retardance is deteriorated and the occurrence amount of CO during combustion is increased. On the other hand, when the ratio of the (A) component exceeds 80, moldability during blending a resin is deteriorated.

In a flame retardant composition of the present invention, plasticizer, pigment, filler, foaming agent, crystalline nucleating agent, lubricant, processing aid, antistatic agent, antioxidant, ultraviolet absorbing agent, heat stabilizer and surface-active agent can be blended as required in addition to the above-mentioned (A) and (B) components in a range of not deteriorating the object of the present invention.

Examples of the thermoplastic resin to be used in the present invention include polyolefins such as polyethylene, polypropylene and polybutylene; methacrylates such as polymethyl methacrylate; polystyrenes such as polystyrene, ABS resin and AS resin; polyesters such as polyethylene terephthalate (PET), polybutylene terephthalate (PBT), polytrimethylene terephthalate, polyethylene naphthalate (PEN) and poly-1,4-cyclohexyldimethylene terephthalate (PCT); polyamides selected from nylons and nylon copolymers such as polycaproamide (nylon 6), polyhexamethylene adipamide (nylon 66), polyhexamethylene sebacamide (nylon 610), polyhexamethylene dodecamide (nylon 612), polydodecaneamide (nylon 12), polyhexamethylene terephthalamide (nylon 6T), polyhexamethylene isophthalamide (nylon 6I), polycaproamide/polyhexamethylene terephthalamide copolymer (nylon 6/6T), polyhexamethylene adipamide/polyhexamethylene terephthalamide copolymer (nylon 66/6T) and polyhexamethylene adipamide/polyhexamethylene isophthalamide copolymer (nylon 66/6I); polyvinyl chlorides; polyoxymethylenes (POM); polycarbonates (PC); polyphenylene sulfides (PPS); modified polyphenylene ethers (PPE); polyetherimides (PEI); polysulfones (PSF); polyethersulfones (PES); polyketones; polyether nitriles (PEN); polyether ketones (PEK); polyether ether ketones (PEEK); polyether ketone ketones (PEKK); polyimides (PI); polyamideimides (PAI); fluororesins; modified resins such that these resins are modified, or mixtures of these resins with each other or other resins.

Examples of the thermosetting resin include phenols, epoxy resins, epoxy acrylates, polyesters (such as unsaturated polyesters), polyurethanes, diallyl phthalates, silicone resins, vinyl esters, melamines, polyimides, polybismaleimide triazine resins (BT resins), cyanates (such as cyanate esters), copolymers thereof, modified resins such that these resins are modified, or mixtures of these resins with each other or other resins.

With regard to the blending ratio of a flame retardant composition to a thermoplastic resin or thermosetting resin, a flame retardant composition is preferably contained in an amount of 50 to 200 parts by mass, more preferably 60 to 150 parts by mass, with respect to 100 parts by mass of a thermoplastic resin or thermosetting resin. The content of the flame retardant composition of not less than 50 parts by mass allows high flame retardance, while the content of not more than 200 parts by mass does not cause flowability necessary for molding to be lost. With regard to the resin composition containing a flame retardant composition of the present invention by the above-mentioned amount, carbon monoxide (CO) concentration in the whole combustion gas by a cone calorimeter in conformity to ISO 5660 becomes not more than 0.01 (g/kg).

In a flame-retardant resin composition of the present invention, plasticizer, pigment, filler, foaming agent, crystalline nucleating agent, lubricant, processing aid, antistatic agent, antioxidant, ultraviolet absorbing agent, heat stabilizer and surface-active agent can be blended as required in addition to the above-mentioned flame retardant composition and thermoplastic or thermosetting resin in a range of not deteriorating the object of the present invention. Also, reinforced fibers such as aramid fiber, glass fiber, carbon fiber, ceramic fiber and fluorine fiber, and fillers such as silica, talc, clay, alumina, mica and vermiculite may be blended unless the object of the present invention is deteriorated.

A flame retardant composition of the present invention can be obtained by dry-blending the above-mentioned resin having an average particle diameter of not more than 1000 μm and metal hydrate.

With regard to a flame-retardant resin composition, shapes of pellet, chopped strand or granule, and a minor axis of 0.1 to 5 mm and a major axis of 0.3 to 10 mm are appropriate for injection molding, extrusion molding, blow molding and film molding. Alternatively, masterbatch in which a flame retardant composition of the present invention is incorporated into a resin at high concentration can also be produced.

A flame-retardant resin composition of the present invention is subject to various kinds of molding such as injection molding, extrusion molding, blow molding, film molding, press molding and pultrusion, to which composition secondary fabrication is further added as required to obtain molded products, electric wires and cables. The above-mentioned addition agents such as plasticizer is blended as required with the molded products, to which desirable properties are also allowed.

Alternatively, a flame-retardant resin composition of the present invention is subject to various kinds of spinning steps such as melt spinning and liquid crystal spinning, to which composition secondary fabrication is further added as required to obtain fiber, and additionally desired post-processing is performed therefor as required to allow fiber post-processed products.

Molded products, electric wires, cables, fiber or fiber post-processed products made of a flame-retardant resin composition of the present invention can be used for all applications in which high flame retardance and electrical characteristics are requested, and are appropriately utilized for insulating materials for electricity.

Molded products, fiber or fiber post-processed products made of a flame-retardant resin composition of the present invention are appropriately utilized also for, beginning with electric wires and cables, electrical and electronic parts such as connector, plug, arm, socket, cap, rotor and motor parts, machine components such as a plate, bearing, gear, cam, pipe and barstock, AV and OA equipment parts such as a speaker cone, bush, washer, guide, pulley, facing, insulator, rod, bearing cage, cabinet, bearing, rod, guide, gear, parts and members for building, stopper for fittings and building materials, guide, sash roller, angle; additionally, helmet, plastic model parts, core materials for tire, reel parts for fishing outfit, seals, packings and gland packing.

EXAMPLES

The present invention is hereinafter described more specifically by using Examples and yet is not limited to only the following Examples. Each physical property value in the following examples and comparative examples is measured as described below.

(LOI Value)
LOI value was measured in accordance with JIS L 1091 method.

(Flame Retardance)
Flame retardance was evaluated with a test piece (bar sample) having a thickness of 1/32 inch in conformity to the vertical flame test prescribed in UL94 of US. UL standard.

(CO Occurrence Amount)
CO concentration (%) in the whole combustion gas was measured when a test piece of a length of 100 mm×a side of 100 mm×a thickness of 3 mm was heated at a heat intensity of 50 kW/m² for 15 minutes in conformity to ISO 5660 by using a cone calorimeter III apparatus manufactured by Toyo Seiki Seisaku-sho, Ltd.

(Average Particle Diameter)
Average particle diameter was measured by a laser analytical scattering method.

Example 1

3% by mass of a polyparaphenylene terephthalamide (PPTA) having an average particle diameter of 200 μm and 97% by mass of aluminum hydroxide ($Al(OH)_3$: 99.5% by mass, $Na_2O$: 0.25% by mass) having an average particle diameter of 10 μm were dry-blended at 600 rpm for 1 minute by a Henschel mixer. 50% by mass of the blend and 50% by mass of a linear low-density polyethylene (LLDPE) (trade name: NEOZEX2540R prime polymer) were melt-kneaded at a cylinder temperature of 280° C. and a screw speed of 220 rpm by a twin-screw extruder having a screw diameter of 45 mm manufactured by Toshiba Machine Co., Ltd. to form strand-shaped gut. The formed gut was cooled by a cooling bath and thereafter granulated by a cutter to obtain pellets. The obtained pellets were molded at a barrel temperature of 280° C. by using an injection molding machine IS100 manufactured by Toshiba Machine Co., Ltd. to obtain a molded product. The results of evaluating the molded product by the above-mentioned methods are shown in Table 1. Consequently, it is confirmed that flame retardance of the molded product subject to injection molding is remarkably improved.

Example 2

3% by mass of a polyimide having an average particle diameter of 60 μm and 97% by mass of aluminum hydroxide ($Al(OH)_3$: 99.5% by mass, $Na_2O$: 0.25% by mass) having an average particle diameter of 10 μm were dry-blended at 600 rpm for 1 minute by a Henschel mixer. 50% by mass of the blend and 50% by mass of a linear low-density polyethylene (LLDPE) (trade name: NEOZEX2540R prime polymer) were blended to obtain pellets in the same manner as in Example 1, which obtained pellets were subject to injection molding to obtain a molded product. The results of evaluating the molded product by the above-mentioned methods are shown in Table 1. Consequently, it is confirmed that flame retardance of the molded product subject to injection molding is remarkably improved.

Comparative Example 1

3% by mass of a polyimide having an average particle diameter of 5000 μm and 97% by mass of aluminum hydroxide ($Al(OH)_3$: 99.5% by mass, $Na_2O$: 0.25% by mass) having an average particle diameter of 10 μm shown in Table 1 were dry-blended at 600 rpm for 1 minute by a Henschel mixer. 50% by mass of the blend and 50% by mass of a linear low-density polyethylene (LLDPE) (trade name: NEOZEX2540R prime polymer) were extruded in the same manner as in Example 1, and then surge and vent-up were caused, so that pellets could not be obtained.

Comparative Example 2

3% by mass of a polyphenylene sulfide (PPS) having an average particle diameter of 100 μm and 97% by mass of aluminum hydroxide (Al(OH)$_3$: 99.5% by mass, Na$_2$O: 0.25% by mass) having an average particle diameter of 10 μm shown in Table 1 were dry-blended at 600 rpm for 1 minute by a Henschel mixer. 50% by mass of the blend and 50% by mass of a linear low-density polyethylene (LLDPE) (trade name: NEOZEX prime polymer) shown in Table 1 were blended and extruded in the same manner as in Example 1, and attempted to be subject to injection molding but yet a predetermined product could not be obtained due to nozzle clogging.

The results in Table 1 showed that the case of only resin powder and only aluminum hydroxide did not bring a flame retardant satisfying both moldability and flame retardance. The case where the melting point of a resin blended with a flame retardant was low (PPS: 320° C.) brought poor flame retardance, and the case where resin particle diameter was too large brought poor molding. In examples of the present invention, the effects were excellent in flame retardance, LOI value and CO occurrence amount.

TABLE 1

| | | particle diameter | Examples | | Comparative Examples | | | |
|---|---|---|---|---|---|---|---|---|
| components | | (μm) | 1 | 2 | 1 | 2 | 3 | 4 |
| formulations | aromatic polyamide | 100 | 3 | | | | | |
| | polyimide | 60 | | 3 | | | | 100 |
| | polyimide | 3000 | | | 3 | | | |
| | PPS | 50 | | | | | 3 | |
| | aluminum hydroxide | 10 | 97 | 97 | 97 | 97 | 100 | |
| | LLDPE | | 100 | 100 | 100 | 100 | 100 | 100 |
| evaluations | flame retardance (UL94) | | V0 | V0 | — | HB | HB | — |
| | LOI | | 33 | 32 | — | 25 | 22 | — |
| | CO occurrence amount (g/kg) | | not more than 0.01 | not more than 0.01 | — | 5.3 | 0.5 | — | unit: part by mass of a linear low-density polyethylene (LLDPE) (trade name: NEOZEX2540R prime polymer) were blended to obtain pellets in the same manner as in Example 1, which obtained pellets were subject to injection molding to obtain a molded product. The results of evaluating the molded product by the above-mentioned methods are shown in Table 1. Consequently, flame retardance is deteriorated and CO occurrence amount is increased.

Comparative Example 3

50% by mass of aluminum hydroxide (Al(OH)$_3$: 99.5% by mass, Na$_2$O: 0.25% by mass) having an average particle diameter of 10 μm and 50% by mass of a linear low-density polyethylene (LLDPE) (trade name: NEOZEX2540R prime polymer) shown in Table 1 were blended to obtain pellets in the same manner as in Example 1, which obtained pellets were subject to injection molding to obtain a molded product. The results of evaluating the molded product by the above-mentioned methods are shown in Table 1. Consequently, flame retardance was deteriorated.

Comparative Example 4

50% by mass of a polyimide having an average particle diameter of 60 μm and 50% by mass of a linear low-density A flame retardant composition for a resin of the present invention is a halogen-free flame retardant, so that the blending with various kinds of resins allows flame retardance, and a flame-retardant resin composition to be obtained has excellent flame retardance and low smoking, so that the development into electrical applications around high voltage is greatly expected, such as electric wires, cables, transformers and resistors.

What is claimed is:

1. A flame retardant composition, comprising
a mixture of (A) polyimide having an average particle diameter of larger than 0 μm and not more than 1000 μm and (B) a metal hydrate.

2. The flame retardant composition according to claim 1, wherein the mass ratio of (A)/(B) is 1/99 to 80/20.

3. The flame retardant composition according to claim 1, wherein the metal hydrate is magnesium hydroxide or aluminum hydroxide.

4. A flame-retardant resin composition containing the flame retardant composition according to claim 1 in an amount of 50 to 200 parts by mass with respect to 100 parts by mass of a thermoplastic resin or a thermosetting resin.

5. The flame-retardant resin composition according to claim 4, wherein carbon monoxide (CO) concentration in the whole combustion gas measured by a cone calorimeter in conformity to ISO 5660 is not more than 0.01 g/kg.

6. The flame retardant composition according to claim 2, wherein the metal hydrate is magnesium hydroxide or aluminum hydroxide.

7. A flame-retardant resin composition containing the flame retardant composition according to claim 2 in an amount of 50 to 200 parts by mass with respect to 100 parts by mass of a thermoplastic resin or a thermosetting resin.

8. A flame-retardant resin composition containing the flame retardant composition according to claim 3 in an amount of 50 to 200 parts by mass with respect to 100 parts by mass of a thermoplastic resin or a thermosetting resin.

9. The flame retardant composition according to claim 1, wherein the polyimide is produced from aromatic tetracarboxylic dianhydride and diamine.

\* \* \* \* \*